United States Patent
Inagaki et al.

(10) Patent No.: US 10,829,043 B2
(45) Date of Patent: Nov. 10, 2020

(54) IMAGE DISPLAY APPARATUS

(71) Applicant: TOYOTA JIDOSHA KABUSHIKI KAISHA, Toyota (JP)

(72) Inventors: Shoji Inagaki, Numazu (JP); Goro Asai, Toyota (JP); Kunihiro Sugihara, Nagakute (JP); Tomoaki Iida, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/120,530

(22) Filed: Sep. 4, 2018

(65) Prior Publication Data
US 2019/0071015 A1 Mar. 7, 2019

(30) Foreign Application Priority Data

Sep. 6, 2017 (JP) .................................. 2017-171071
May 15, 2018 (JP) .................................. 2018-094019

(51) Int. Cl.
*B60R 1/00* (2006.01)
*H04N 5/225* (2006.01)
(Continued)

(52) U.S. Cl.
CPC ................ *B60R 1/00* (2013.01); *B60K 35/00* (2013.01); *B60Q 9/00* (2013.01); *H04N 5/2252* (2013.01);
(Continued)

(58) Field of Classification Search
CPC ...... B60K 2370/176; B60K 2370/1868; B60K 2370/21; B60K 2370/52; B60K 2370/797; B60K 35/00; B60R 1/00; B60R 2300/70; B60R 2300/80; B60R 2300/802; B60R 11/04; B60R 2300/806; H04N 7/181; G06K 9/00778; G06K 9/00785; G06K 9/00791; G06K 9/00798; G06K 9/00805; G06K 9/00812; G06K 9/00818; G06K 9/00825;
(Continued)

(56) References Cited

U.S. PATENT DOCUMENTS 7,379,089 B2 * 5/2008 Takagi ................... H04N 7/181
348/148
9,470,034 B2 * 10/2016 Ihlenburg ................ E05F 15/73
(Continued)

FOREIGN PATENT DOCUMENTS

JP 2004-306670 A 11/2004
JP 2006-103526 A 4/2006
(Continued)

*Primary Examiner* — Nathnael Aynalem
(74) *Attorney, Agent, or Firm* — Sughrue Mion, PLLC

(57) ABSTRACT

An image display apparatus has: an imaging device (11L, 11R) that is placed at a door (15L, 15R) of a vehicle (1) and that is configured to image an external circumstance of the vehicle; a displaying device (14) that is configured to display an external image captured by the imaging device; and a controlling device (132, 133) that is configured to control an display aspect of the display when the display displays the external image, the controlling device is configured to control the display aspect such that the display aspect when the door is in an opened state is different from the display aspect when the door is in a closed state.

10 Claims, 8 Drawing Sheets

(51) Int. Cl.
  *B60Q 9/00* (2006.01)
  *H04N 7/18* (2006.01)
  *B60K 35/00* (2006.01)
(52) U.S. Cl.
  CPC ....... *H04N 7/183* (2013.01); *B60K 2370/176* (2019.05); *B60K 2370/1868* (2019.05); *B60K 2370/21* (2019.05); *B60K 2370/52* (2019.05); *B60K 2370/777* (2019.05); *B60K 2370/797* (2019.05); *B60R 2300/70* (2013.01); *B60R 2300/80* (2013.01); *B60R 2300/802* (2013.01)
(58) Field of Classification Search
  CPC ............... G06K 9/00845; G06K 9/325; G06K 2209/15; G06T 2207/30236; G06T 2207/30248; G06T 2207/30252; G06T 2207/30256; G06T 2207/30261; G06T 2207/30264; G06T 2207/30268; G08G 1/16; G08G 1/116; B60W 50/14; B60W 2050/143; B60W 2550/10; B60W 2550/14
  USPC ....................................................... 348/148
  See application file for complete search history.

(56) References Cited

U.S. PATENT DOCUMENTS

| | | | |
|---|---|---|---|
| 2004/0196368 A1 | 10/2004 | Asai | |
| 2006/0029271 A1* | 2/2006 | Miyoshi | G06T 3/00 382/154 |
| 2006/0187304 A1* | 8/2006 | Sakata | H04N 7/181 348/148 |
| 2012/0320212 A1* | 12/2012 | Aimura | B60R 1/00 348/148 |
| 2015/0066237 A1 | 3/2015 | Kwon | |
| 2015/0300073 A1* | 10/2015 | Ihlenburg | E05F 15/73 701/49 |
| 2015/0350607 A1* | 12/2015 | Kim | H04N 7/181 348/148 |
| 2016/0314362 A1* | 10/2016 | Elie | G06K 9/00805 |
| 2017/0106797 A1 | 4/2017 | Okohira et al. | |
| 2017/0346997 A1* | 11/2017 | Sato | B60R 1/00 |
| 2018/0164831 A1* | 6/2018 | Han | H04L 29/06027 |
| 2018/0195317 A1* | 7/2018 | Okuma | B60R 11/04 |
| 2019/0084495 A1* | 3/2019 | Yamada | B60R 11/04 |
| 2019/0308562 A1* | 10/2019 | Yamada | B60R 11/0235 |

FOREIGN PATENT DOCUMENTS

| | | | | |
|---|---|---|---|---|
| JP | 2006-224873 A | 8/2006 | | |
| JP | 2006-298130 A | 11/2006 | | |
| JP | 2007-118762 A | 5/2007 | | |
| JP | 2013-001298 A | 1/2013 | | |
| JP | 2018110294 A | * | 7/2018 | ............... H04N 7/18 |
| KR | 10-2016-0136779 A | 11/2016 | | |
| WO | 2016/002203 A1 | 1/2016 | | |

* cited by examiner

[FIG. 1]
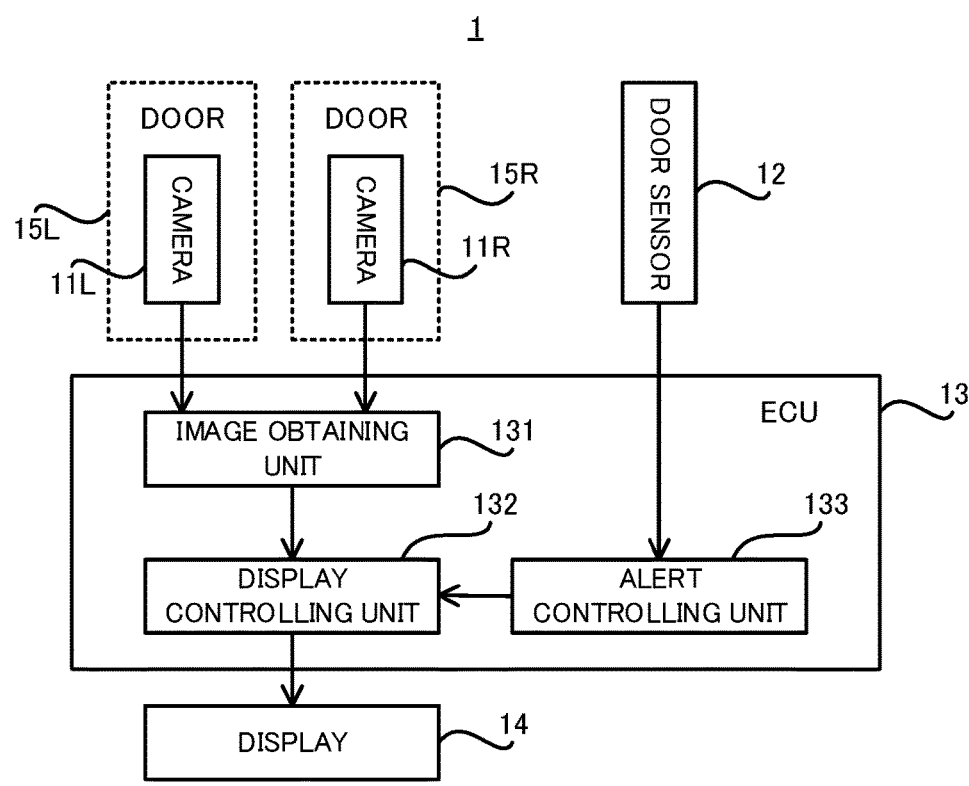

[FIG. 2]
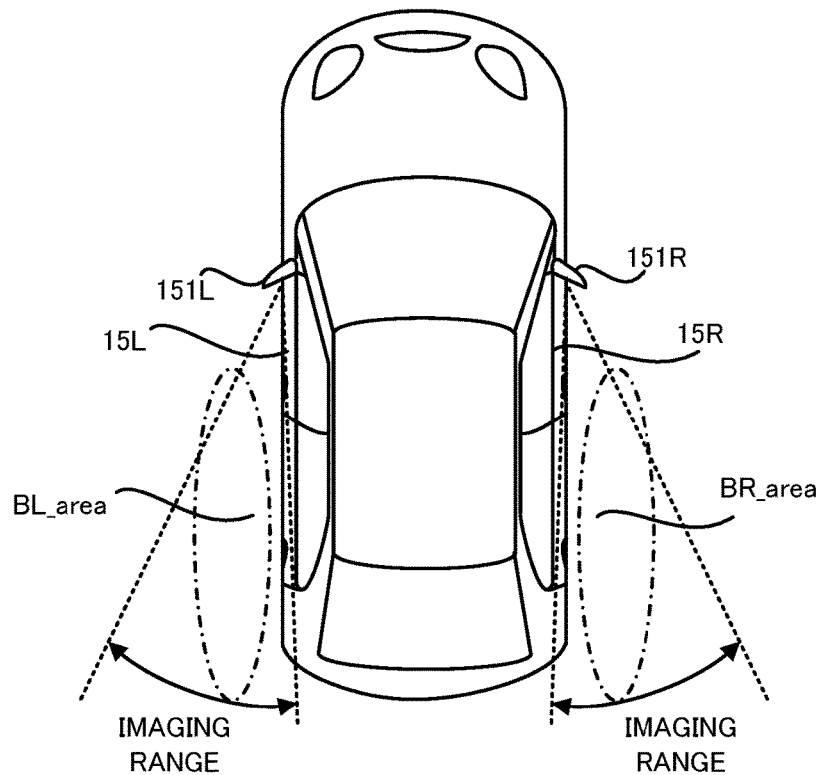
[FIG. 3]
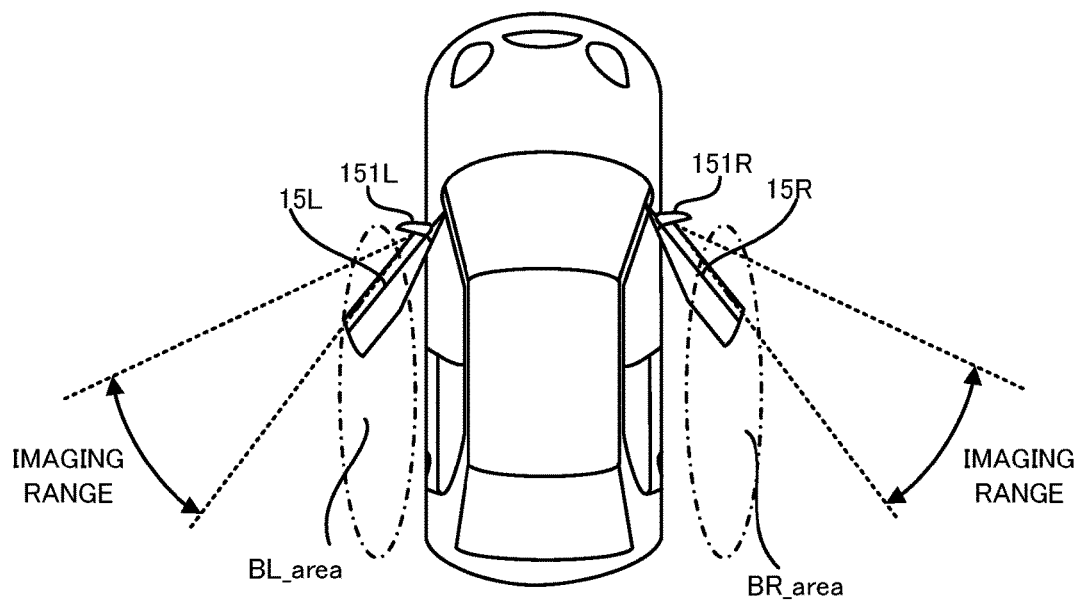

[FIG. 4]
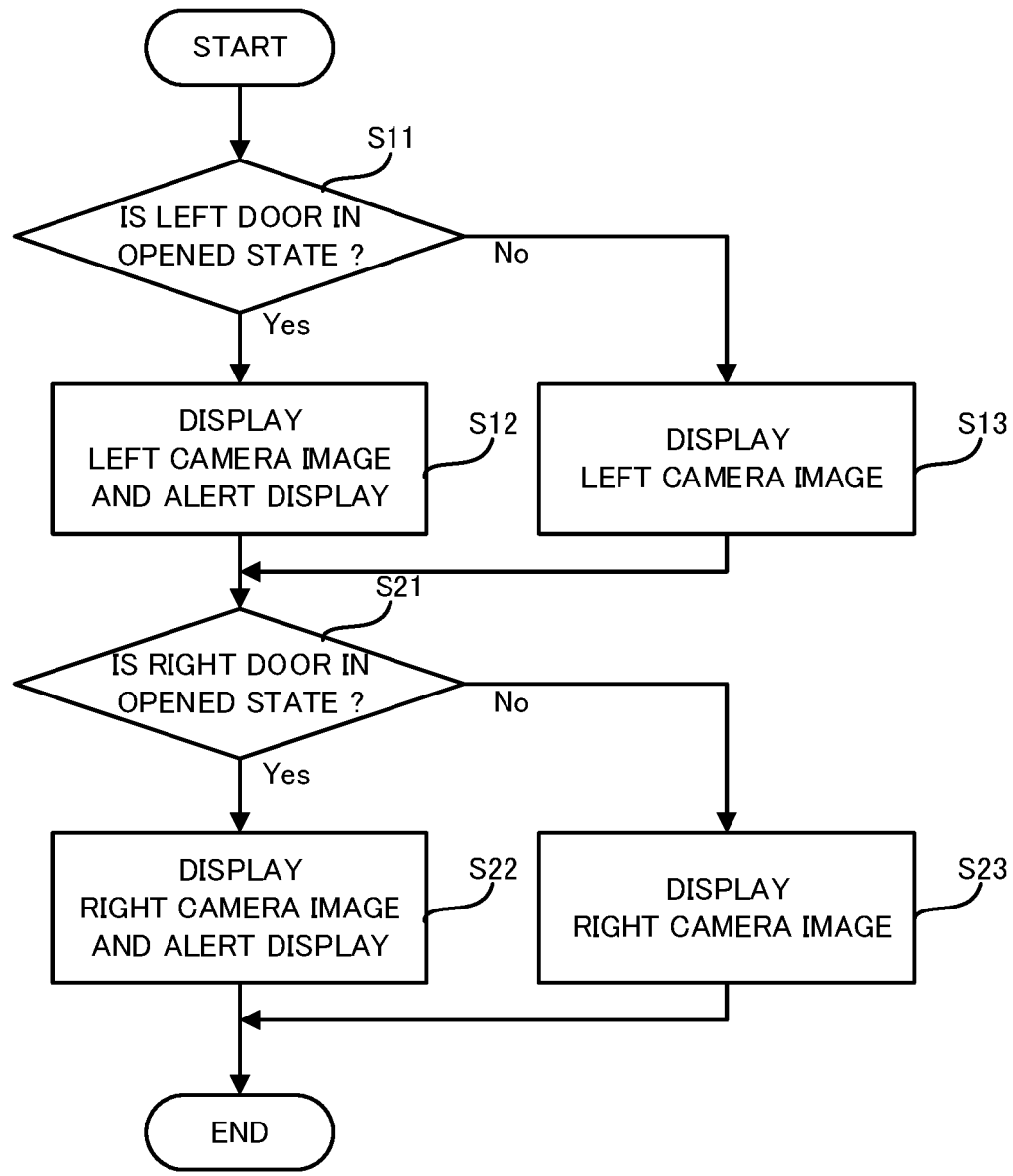

[FIG. 6]
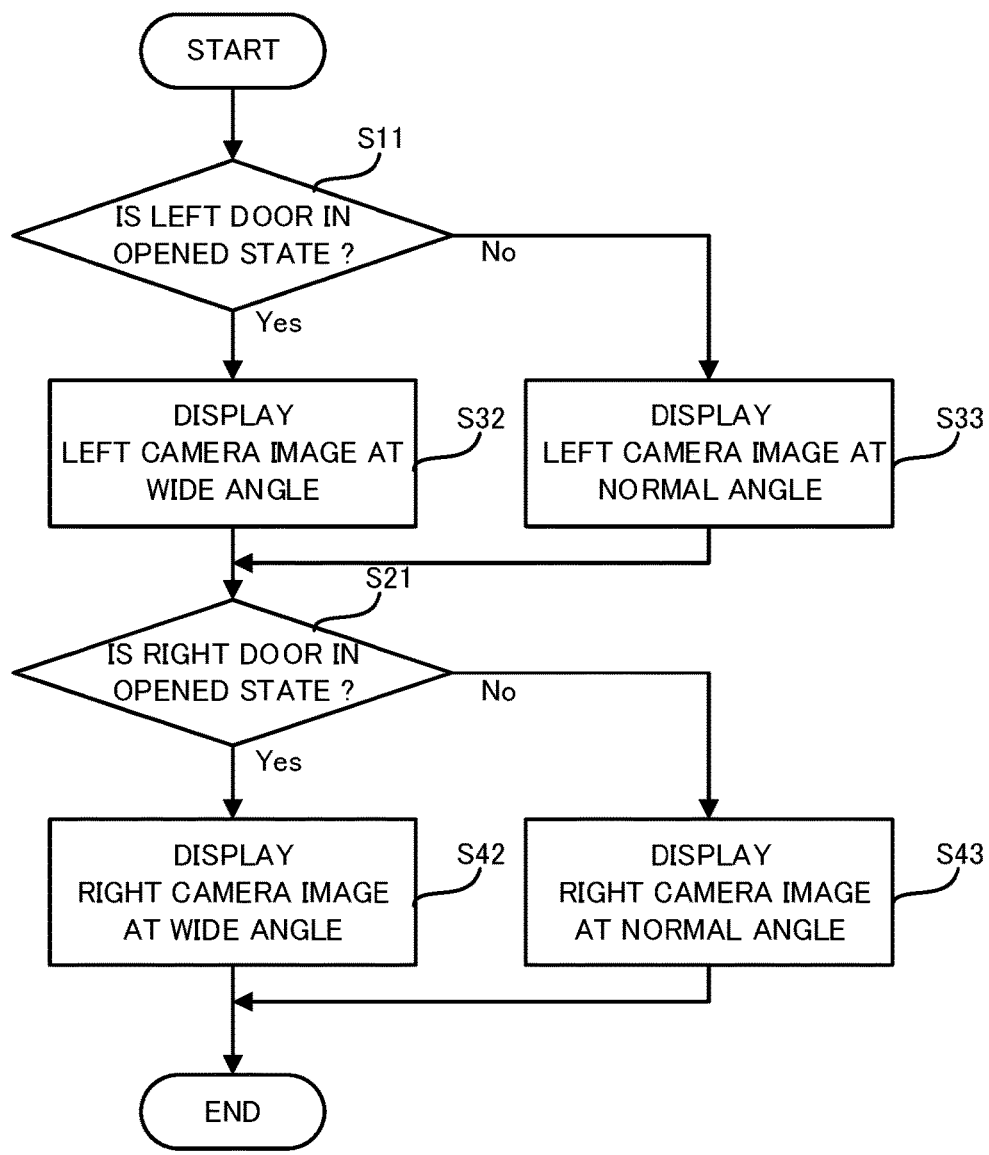

IMAGE DISPLAY APPARATUS

TECHNICAL FIELD

The present invention relates to a technical field of an image display apparatus that is configured to display, to an occupant of a vehicle, an image of an external circumstance of the vehicle that is captured by a camera placed at a door of the vehicle, for example.

BACKGROUND ART

A Patent Literature 1 discloses one example of an image display apparatus. Specifically, the Patent Literature 1 discloses a monitoring apparatus for a vehicle that is configured to monitor a surrounding of the vehicle by displaying an image that is captured (in other words, imaged) by a camera placed at a door mirror of the vehicle.

Note that there are a Patent Literature 2 and a Patent Literature 3 as other documents relating to the present invention.

CITATION LIST

Patent Literature

[Patent Literature 1] Japanese Unexamined Patent Application Publication No. 2013-001298
[Patent Literature 2] Japanese Unexamined Patent Application Publication No. 2004-306670
[Patent Literature 3] WO2016/002203

SUMMARY OF INVENTION

Technical Problem

The camera placed at the door mirror (namely, the camera located at a door) is usually used as a substitute (in other words, an alternative) of the door mirror. Namely, the camera placed at the door is usually used as an electronic mirror. In this case, the camera is configured to image (in other words, capture an image of) an area including a rear side area of the vehicle (namely, a desired area that is expected to be imaged by the camera). In this case, the camera usually images a side surface of the door that is a side surface of the vehicle. Therefore, the image showing the side surface of the door and the desired area outside the vehicle is displayed on a display.

If a state of the door is changed from a closed state to an opened state (namely, if the closed door is opened), a direction of the camera (for example, a direction of an optical axis of the camera) is also changed depending on a movement of the door. As a result, the camera images an area that is different from the desired area (namely, the camera images an undesired area that is not expected to be imaged by the camera). Thus, if the door is in the opened state, the image showing the undesired area is displayed on the display.

In this case, there is a relatively high possibility that the camera keeps imaging the side surface of the door after the state of the door is changed to the opened state, because the direction of the camera is changed in a same manner as the movement of the door. Therefore, the image showing the side surface of the door and the undesired area is displayed on the display. If the image showing the side surface of the door is kept to be displayed after the state of the door is changed to the opened state, there is a possibility that an occupant (in other words, a person in the vehicle or a driver) who does not become aware that the door is in the opened state misunderstands that the image displayed on the display is the image showing the side surface of the door and the desired area. As a result, there is a possibility that the occupant misunderstands the circumstance at the rear side area of the vehicle.

Note that same technical problem occurs in the case where the camera is placed at a movable housing. Specifically, there is a possibility that the image showing the undesired area is displayed on the display due to the movement of the housing. As a result, if the displayed image shows the side surface of the door, there is a possibility that the occupant misunderstands the circumstance at the rear side area of the vehicle. Moreover, even if the displayed image does not show the side surface of the door, there may be a possibility that the occupant misunderstands the circumstance at the rear side area of the vehicle, depending on the content of the displayed image.

The above described technical problem is one example of the technical problem to be solved by the present invention. It is therefore an object of the present invention to provide, for example, an image display apparatus that is configured to display, on a displaying device, an image of an external circumstance of a vehicle that is captured by a camera placed at a door (or a movable housing) of the vehicle and that is configured to prevent an occupant who watches the image displayed on the displaying device when the door is in an opened state (or the housing is in a specific state) from misunderstanding an surrounding circumstance of the vehicle.

Solution to Problem

One aspect of an image display apparatus of the present invention is an image display apparatus having: an imaging device that is placed at a door of a vehicle and that is configured to image an external circumstance of the vehicle; a displaying device that is configured to display an external image captured by the imaging device; and a controlling device that is configured to control a display aspect of the displaying device when the display device displays the external image, the controlling device is configured to control the display aspect such that the display aspect when the door is in an opened state is different from the display aspect when the door is in a closed state.

Another aspect of an image display apparatus of the present invention is an image display apparatus having: an imaging device that is placed at a movable housing and that is configured to image an external circumstance of a vehicle; a displaying device that is configured to display an external image captured by the imaging device; and a controlling device that is configured to control a display aspect of the displaying device when the displaying device displays the external image, the controlling device being configured to control the display aspect such that the display aspect when the housing is in a first state is different from the display aspect when the housing moves to be is in a second state that is different from the first state.

BRIEF DESCRIPTION OF DRAWINGS

FIG. 1 is a block diagram that illustrates a structure of a vehicle in a present embodiment.

FIG. 2 is a planer view that illustrates positions at which a left camera and a right camera are placed, respectively, and an imaging range of each of the left camera and the right camera in the vehicle in the present embodiment.

FIG. 3 is a planer view that illustrates the imaging range of each of the left camera and the right camera when a door is in an opened state.

FIG. 4 is a flowchart that illustrates a flow of a display operation in the present embodiment.

FIG. 6 is a flowchart that illustrates a flow of a display operation in a first modified example.

DESCRIPTION OF EMBODIMENTS

Figure 5A:
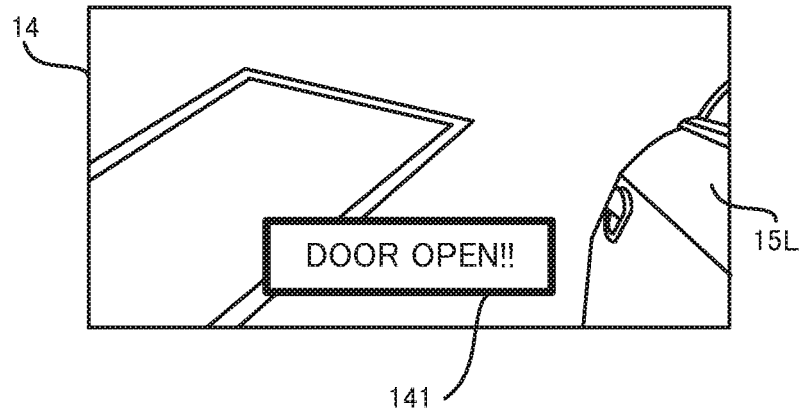
FIG. 5 Each of FIG. 5(*a*) to FIG. 5(*c*) is a planar view that illustrates one example of an alert display.

Hereinafter, with reference to drawings, one embodiment of the image display apparatus of the present invention will be described. In the following description, a vehicle 1 to which one embodiment of the image display apparatus of the present invention is adapted will be described.

(1) Structure of Vehicle 1

Firstly, with reference to FIG. 1 and FIG. 2, the structure of the vehicle 1 in the present embodiment will be explained. FIG. 1 is a block diagram that illustrates the structure of the vehicle 1 in a present embodiment. FIG. 2 is a planer view that illustrates positions at which a left camera 11L and a right camera 11R are placed, respectively, and an imaging range of each of the left camera 11L and the right camera 11R in the vehicle 1 in the present embodiment.

As illustrated in FIG. 1, the vehicle 1 has: the left camera 11L that is one example of an "imaging device" or an "imager" in a below described additional statement; the right camera 11R that is one example of a "imaging device" or an "imager" in the below described additional statement; a door sensor 12; an ECU (Electronic Control Unit) 13; and a display 14 that is one example of a "displaying device" or a "display" in the below described additional statement.

The left camera 11L is an imaging device that is placed at a left door 15L located at a left side of the vehicle 1. As illustrated in FIG. 2, the left camera 11L may be placed (in other words, housed) in a camera housing 151L that protrudes toward the left side from the left door 15L. The camera housing 151L is a structural object that has an appearance same as or similar to a housing for housing a door mirror and that is used to house the left camera 11L. However, the left camera 11L may be placed at a structural object that is different from the camera housing 151L, that is coupled with the left door 15L or that is integrated with the left door 15L. Alternatively, the left camera 11L may be directly placed at the left door 15L.

The left camera 11L is configured to image (in other words, capture an image of) a left rear area BL_area on the rear and the left of the vehicle 1 when the left door 15L at which the left camera 11L is placed is in a closed state (namely, the left door 15L is closed), as illustrated in FIG. 2. The left rear area BL_area corresponds to an area that is reflected in a door mirror placed at the left door 15L when the left door 15L is in the closed state, under the assumption that the door mirror is placed at the left door 15L. Namely, the left camera 11L is used as a substitute of the door mirror placed at the left door 15L and constitutes one portion of what we call an electronic mirror, in the present embodiment.

The right camera 11R is an imaging device that is placed at a right door 15R located at a right side of the vehicle 1. As illustrated in FIG. 2, the right camera 11R may be placed (in other words, housed) in a camera housing 151R that protrudes toward the right side from the right door 15R. The camera housing 151R is a structural object that has an appearance same as or similar to a housing for housing a door mirror and that is used to house the right camera 11R. However, the right camera 11R may be placed at a structural object that is different from the camera housing 151R, that is coupled with the right door 15R or that is integrated with the right door 15R. Alternatively, the right camera 11R may be directly placed at the right door 15R.

The right camera 11R is configured to image (in other words, capture an image of) a right-rear area BR_area on the rear and the right of the vehicle 1 when the right door 15R at which the right camera 11R is placed is in a closed state (namely, the right door 15R is closed), as illustrated in FIG. 2. The right-rear area BR_area corresponds to an area that is reflected in a door mirror placed at the right door 15R when the right door 15R is in the closed state, under the assumption that the door mirror is placed at the right door 15R. Namely, the right camera 11R is used as a substitute of the door mirror placed at the right door 15R and constitutes one portion of what we call the electronic mirror, in the present embodiment.

The door sensor 12 is configured to detect whether or not each of the left door 15L and the right door 15R is in an opened state (namely, each of the left door 15L and the right door 15R is opened). Namely, the door sensor 12 is configured to detect whether the left door 15L is in the opened state or the closed state and whether the right door 15R is in the opened state or the closed state. Note that each of the left door 15L and the right door 15R is a door that is allowed to be opened and closed in a horizontal direction (namely, a direction along a surface of paper of FIG. 2 and typically a right-left direction or a lateral direction) in the present embodiment. Moreover, the "left door 15L in the closed state" in the present embodiment means the left door 15L that is thoroughly closed (namely, not in a half shut state). On the other hand, the "left door 15L in the opened state" in the present embodiment means the left door 15L that is not in the closed state. Thus, the left door 15L that is in the half shut state corresponds to the left door 15L in the opened state. The same applies to the right door 15R.

The ECU 13 is configured to control entire operation of the vehicle 1. Especially in the present embodiment, the ECU 13 is configured to perform a display operation for displaying, on the display 14, the image captured by the left camera 11L (namely, the image showing the circumstance of the left rear area BL_area, and it is referred to as a "left camera image") and the image captured by the right camera 11R (namely, the image showing the circumstance of the right-rear area BR_area, and it is referred to as a "right camera image"). In order to perform the display operation, the ECU 13 includes, as processing blocks that are logically realized in the ECU 13 or processing circuits that are physically realized in the ECU 13, an image obtaining unit 131 and a display controlling unit 132 that is one example of a "controlling device" or a "controller" in the below described additional statement. The image obtaining unit 131 is configured to obtain the left camera image and the right camera image. The display controlling unit 132 is configured to control the display 14 to display the left camera image and the right camera image obtained by the image obtaining unit 131. Note that the display 14 is placed in a vehicle interior (in other words, a cabin) of the vehicle 1 and is configured to display the left camera image and the right camera image to an occupant (in other words, a person or a driver) of the vehicle 1 in the vehicle interior.

By the way, the left camera 11L images the left rear area BL_area of the vehicle 1 when the left door 15L is in the closed state, as described above. Moreover, as illustrated in FIG. 2, a side surface of the left door 15L is included in an imaging range of the left camera 11L. Thus, if the left door 15L is in the closed state, the display 14 displays the left camera image showing the side surface of the left door 15L and the circumstance of the left-rea area BL_area (namely, the left camera image including an image part of the side surface of the left door 15L and an image part of the circumstance of the left-rea area BL_area).

On the other hand, the left door 15L may be in the opened state. Here, since the left camera 11L is placed at the left door 15L, if the left door 15L is opened so that the state of the left door 15L is changed from the closed state to the opened state, a direction of the left camera 11L is changed depending on a movement of the opened left door 15L. Thus, if the left door 15L is in the opened state, the left camera 11L is not capable of imaging the left rear area BL_area of the vehicle 1 appropriately, as illustrated in FIG. 3. Thus, the left camera image is not the image showing the circumstance of the left rear area BL_area that is expected to be imaged by the left camera 11L. Namely, the left camera image is the image showing the circumstance of an undesired area that is not expected to be imaged by the left camera 11L. Moreover, since the left camera 11L is placed at the left door 15L, even if the left door 15L is opened so that the state of the left door 15L is changed from the closed state to the opened state, the side surface of the left door 15L keeps being included in the imaging range of the left camera 11L, as illustrated in FIG. 3. Thus, the display 14 displays the left camera image showing the side surface of the left door 15L and the circumstance of the undesired area that is not expected to be imaged by the left camera 11L.

Therefore, the display 14 displays the left camera image showing the side surface of the left door 15L and the side circumstance of the vehicle 1 not only in the case where the left door 15L is in the closed state but also in the case where the left door 151 is in the opened state. Moreover, if the left door 15L is allowed to be opened and closed in the horizontal direction, there is a relatively high possibility that the occupant of the vehicle 1 is more likely not to able to easily distinguish the side circumstance of the vehicle 1 shown by the left camera image when the left door 15L is in the opened state from the side circumstance of the vehicle 1 shown by the left camera image when the left door 15L is in the closed state at first glance. Thus, if the left door 15L is in the opened state, there is a possibility that the occupant of the vehicle 1 who does not become aware that the left door 15L is in the opened state does not become aware that the left camera image displayed on the display 14 is the image showing the circumstance of the undesired area that is not expected to be imaged by the left camera 11L. Namely, there is a possibility that the occupant of the vehicle 1 misunderstands that the left camera image displayed on the display 14 is the image showing the circumstance of the left rear area BL_area, although the display 14 displays the left camera image showing the circumstance of the undesired area that is not expected to be imaged by the left camera 11L due to the left door 15L being in the opened state. As a result, there is a possibility that the occupant may misunderstand the circumstance of the left rear area BL_area of the vehicle 1.

Moreover, also in the case where the right door 15R is in the opened state, there is a possibility that the occupant of the vehicle 1 who does not become aware that the right door 15R is in the opened state does not become aware that the right camera image displayed on the display 14 is the image showing the circumstance of the undesired area that is not expected to be imaged by the right camera 11R. Namely, there is a possibility that the occupant of the vehicle 1 misunderstands that the right camera image displayed on the display 14 is the image showing the circumstance of the right rear area BR_area, although the display 14 displays the right camera image showing the circumstance of the undesired area that is not expected to be imaged by the right camera 11R due to the right door 15R being in the opened state. As a result, there is a possibility that the occupant may misunderstand the circumstance of the right rear area BR_area of the vehicle 1.

Thus, in the present embodiment, the ECU 13 controls the display 14 to perform an alert display for alerting that the left door 15L is in the opened state, if the left door 15L is in the opened state during the display operation being performed, in order to prevent the occupant from misunderstanding the circumstance of the left rear area BL_area of the vehicle 1 when the left door 15L is in the opened state. Namely, the ECU 13 controls a display aspect (in other words, a display manner) of the display 14 such that the display aspect of the display 14 is changed by performing the alert display in the case where the left door 15L is in the opened state, compared to the case where the left door 15L is in the closed state. Moreover, the ECU 13 controls the display 14 to perform an alert display for alerting that the right door 15R is in the opened state, if the right door 15R is in the opened state during the display operation being performed, in order to prevent the occupant from misunderstanding the circumstance of the right rear area BR_area of the vehicle 1 when the right door 15R is in the opened state. Namely, the ECU 13 controls the display aspect of the display 14 such that the display aspect of the display 14 is changed by performing the alert display in the case where the right door 15R is in the opened state, compared to the case where the right door 15R is in the closed state. In order to perform the alert display, the ECU 13 includes, as a processing block that is logically realized in the ECU 13 or a processing circuit that is physically realized in the ECU 13, an alert controlling unit 133 that is one example of the "controlling device" or the "controller" in the below described additional statement. The alert controlling unit 133 controls the display controlling unit 132 to perform the alert display. In the following description, the display operation for performing the alert display will be described in detail.

(2) Flow of Display Operation Performed by ECU 13

Next, with reference to FIG. 4, a flow of the display operation in the present embodiment will be described. FIG. 4 is a flowchart that illustrates a flow of the display operation in the present embodiment.

As illustrated in FIG. 4, the alert controlling unit 133 determines on the basis of a detection result of the door sensor 12 whether or not the left door 15L is in the opened state (a step S11).

As a result of the determination at the step S11, if it is determined that the left door 15L is in the opened state (the step S11: Yes), the alert controlling unit 133 controls the display controlling unit 132 to perform the alert display (namely, the alert display for alerting that the left door 15L is in the opened state, the same applies to the description of the step S11 to a step S13) (a step S12). Thus, the display controlling unit 132 controls the display 14 to perform the alert display while displaying the left camera image (the step S12). More specifically, the display controlling unit 132 controls the display 14 to display the left camera image and to perform the alert display in a first display region that is at least one portion of a display screen of the display 14 and on which the left camera image should be displayed. As a result, the display 14 performs the alert display while displaying the left camera image (the step S12).

Figure 5B:
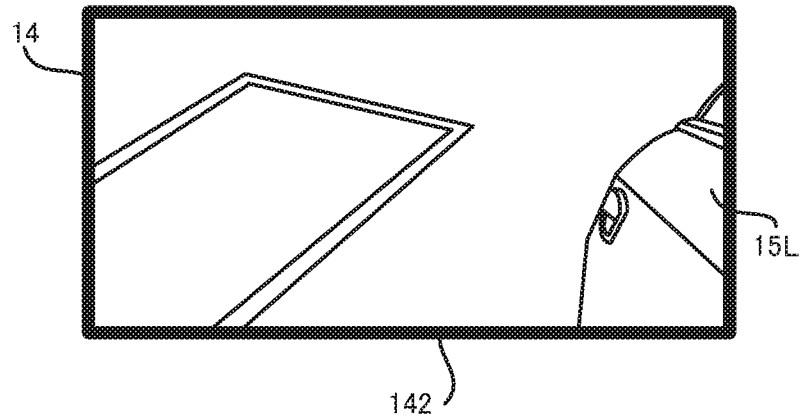
Figure 5C:
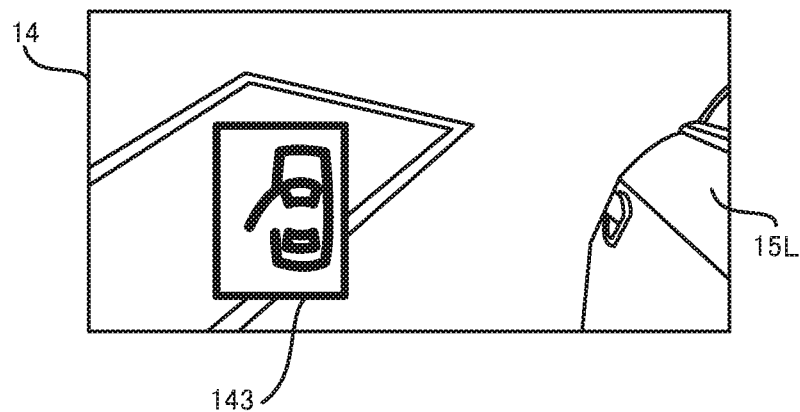

Here, with reference to FIG. 5(a) to FIG. 5(c), one example of the alert display will be described. As illustrated in FIG. 5(a), the display controlling unit 132 may control the display 14 to perform a first example of the alert display for displaying an alert message 141 (an alert message including a text "DOOR OPEN!" in an example illustrated in FIG. 5(a)) for alerting that the left door 15L is in the opened state. As illustrated in FIG. 5(b), the display controlling unit 132 may control the display 14 to perform a second example of the alert display for alerting that the left door 15L is in the opened state by a decorated display of an outer frame 142 of the left camera image. FIG. 5(b) illustrates an example in which the decorated display is a display for highlighting the outer frame 142 so that the outer frame 142 is distinct. However, the decorated display may be a display that is different from the display for highlighting the outer frame 142. For example, the decorated display may be a display for blinking the outer frame 142. For example, the decorated display may be a display for changing a color of the outer frame 142. As illustrated in FIG. 5(c), the display controlling unit 132 may control the display 14 to perform a third example of the alert display for displaying an alert icon 143 for alerting that the left door 15L is in the opened state. In any case, the display controlling unit 132 controls the display 14 to perform the alert display while keeping displaying the left camera image during a period when the left door 15L is in the opened state. Note that the display controlling unit 132 may control the display 14 to perform the alert display by combining at least two of the first example to the third example of the alert display illustrated in FIG. 5(a) to FIG. 5(c).

Again in FIG. 4, on the other hand, as a result of the determination at the step S11, if it is determined that the left door 15L is not in the opened state (namely, is in the closed state) (the step S11: No), the alert controlling unit 133 does not control the display controlling unit 132 to perform the alert display. Thus, the display controlling unit 132 controls the display 14 to display the left camera image and not to perform the alert display (a step S13). More specifically, the display controlling unit 132 controls the display 14 to display the left camera image in the first display region that is at least one portion of the display screen of the display 14 and on which the left camera image should be displayed. As a result, the display 14 displays the left camera image without performing the alert display.

In parallel with, after or before the process from the step S11 to the step S13, the alert controlling unit 133 determines on the basis of the detection result of the door sensor 12 whether or not the right door 15R is in the opened state (a step S21).

As a result of the determination at the step S21, if it is determined that the right door 15R is in the opened state (the step S21: Yes), the alert controlling unit 133 controls the display controlling unit 132 to perform the alert display (namely, the alert display for alerting that the right door 15R is in the opened state, the same applies to the description of the step S21 to a step S23) (a step S22). Thus, the display controlling unit 132 controls the display 14 to perform the alert display while displaying the right camera image (the step S22). More specifically, the display controlling unit 132 controls the display 14 to display the right camera image and to perform the alert display in a second display region that is at least one portion of the display screen of the display 14 and on which the right camera image should be displayed. As a result, the display 14 performs the alert display while displaying the right camera image (the step S22). Note that the alert display for alerting that the right door 15R is in the opened state may be same as the alert display for alerting that the left door 15L is in the opened state.

On the other hand, as a result of the determination at the step S21, if it is determined that the right door 15R is not in the opened state (namely, is in the closed state) (the step S21: No), the alert controlling unit 133 does not control the display controlling unit 132 to perform the alert display. Thus, the display controlling unit 132 controls the display 14 to display the right camera image and not to perform the alert display (a step S23). More specifically, the display controlling unit 132 controls the display 14 to display the right camera image in the second display region that is at least one portion of the display screen of the display 14 and on which the right camera image should be displayed. As a result, the display 14 displays the right camera image without performing the alert display.

(3) Technical Effect

As described above, in the present embodiment, if the left door 15L is in the opened state, the display 14 for displaying the left camera image performs the alert display for alerting that the left door 15L is in the opened state while displaying the left camera image. Especially, the image and the like relating to the alert display is displayed in the first display region on which the left camera image is displayed, and thus, there is less possibility that the occupant who watches the left camera image passes over (in other words, miss) the alert display. Thus, the occupant is capable of understanding that the left camera image displayed on the display 14 is not the image showing the circumstance of the left rear area BL_area that is expected to be imaged by the left camera 11L. In other words, the occupant does not misunderstand that the left camera image displayed on the display 14 is the image showing the circumstance of the left rear area BL_area. Thus, it is possible to appropriately prevent the occupant who watches the left camera image displayed on the display 14 when the left door 15L is in the opened state from misunderstanding the surrounding circumstance of the vehicle 1 (especially, the circumstance of the left rear area BL_area).

Similarly, in the present embodiment, if the right door 15R is in the opened state, the display 14 for displaying the right camera image performs the alert display for alerting that the right door 15R is in the opened state while displaying the right camera image. Especially, the image and the like relating to the alert display is displayed in the second display region on which the right camera image is displayed, and thus, there is less possibility that the occupant who watches the right camera image passes over (in other words, miss) the alert display. Thus, the occupant of the vehicle 1 is capable of understanding that the right camera image displayed on the display 14 is not the image showing the circumstance of the right rear area BR_area that is expected to be imaged by the right camera 11R. In other words, the occupant of the vehicle 1 does not misunderstand that the right camera image displayed on the display 14 is the image showing the circumstance of the right rear area BR_area. Thus, it is possible to appropriately prevent the occupant who watches the right camera image displayed on the display 14 when the right door 15R is in the opened state from misunderstanding the surrounding circumstance of the vehicle 1 (especially, the circumstance of the right rear area BR_area).

(4) Modified Example (4-1) First Modified Example

In the above described description, the ECU 13 controls the display aspect of the display 14 such that the display aspect of the display 14 is changed by performing the alert display in the case where the left door 15L is in the opened state, compared to the case where the left door 15L is in the closed state. On the other hand, in the first modified example, the ECU 13 controls the display aspect of the display 14 such that the display aspect of the display 14 is changed by enlarging (in other words, widening) an angle of view of the left camera image displayed on the display 14 (namely, by displaying the left camera image at a wider angle) in the case where the left door 15L is in the opened state, compared to the case where the left door 15L is in the closed state. Note that the "angle of view of the left camera image (hereinafter, it is referred to as a "left image angle θL")" in the first modified example is a parameter for representing a range of the scene shown by (in other words, included in) the left camera image that is actually displayed on the display 14 by using an angle from a certain virtual viewpoint. Therefore, as the left image angle θL becomes larger (in other words, wider), the left camera image shows the scene covering a wider range.

Similarly, in the above described description, the ECU 13 controls the display aspect of the display 14 such that the display aspect of the display 14 is changed by performing the alert display in the case where the right door 15R is in the opened state, compared to the case where the right door 15R is in the closed state. On the other hand, in the first modified example, the ECU 13 controls the display aspect of the display 14 such that the display aspect of the display 14 is changed by enlarging (in other words, widening) an angle of view of the right camera image displayed on the display 14 (namely, by displaying the right camera image at a wider angle) in the case where the right door 15R is in the opened state, compared to the case where the right door 15R is in the closed state. Note that the "angle of view of the right camera image (hereinafter, it is referred to as a "right image angle θR")" in the first modified example is a parameter for representing a range of the scene shown by (in other words, included in) the right camera image that is actually displayed on the display 14 by using an angle from a certain virtual viewpoint. Therefore, as the right image angle θR becomes larger (in other words, wider), the right camera image shows the scene covering a wider range.

In the below described description, a flow of the display operation in the first modified example will be described with reference to FIG. 6. FIG. 6 is a flow chart that illustrates a flow of the display operation in the first modified example. Note that a detailed description about a process that is same as the process in the above described display operation illustrated in FIG. 4 will be omitted by assigning a same step number.

As illustrated in FIG. 6, in the first modified example, the display controlling unit 132 determines on the basis of the detection result of the door sensor 12 whether or not the left door 15L is in the opened state (the step S11).

As a result of the determination at the step S11, if it is determined that the left door 15L is in the opened state (the step S11: Yes), the display controlling unit 132 sets the left image angle θL to a wide angle θL_wide and controls the display 14 to display the left camera image that corresponds to the wide angle θL_wide (a step S32). On the other hand, as a result of the determination at the step S11, if it is determined that the left door 15L is not in the opened state (namely, is in the closed state) (the step S11: No), the display controlling unit 132 sets the left image angle θL to a normal angle θL_normal and controls the display 14 to display the left camera image that corresponds to the normal angle θL_normal (a step S33). The wide angle θL_wide is larger (in other words, wider) than the normal angle θL_normal. Thus, when the left door 15L is in the opened state, the left camera image is displayed at a wide angle (namely, the left camera image is displayed at the angle of view that is larger (wider) than the angle of view used when the left door 15L is in the closed state).

The wide angle θL_wide and the normal angle θL_normal may be set in advance or may be set by the display controlling device 132 during the display operation. In this case, the normal angle θL_normal may be set such that the scene shown by the left camera image corresponding to the normal angle θL_normal is same as the scene that is reflected in the door mirror placed at the left door 15L when the left door 15L is in the closed state, under the assumption that the door mirror is placed at the left door 15L.

Here, the display of each of the left camera image corresponding to the wide angle θL_wide and the left camera image corresponding to the normal angle θL_normal will be described. In the first modified example, the left camera 11L is configured to image a left rear area BL_area wide that includes the above described left rear area BL_area and that is larger than the left rear area BL_area. Therefore, an angle of view of the left camera 11L in the first modified example is larger than the angle of view of the left camera 11L when the above described display operation illustrated in FIG. 4. Note that the angle of view of the camera (hereinafter, it is referred to as an "imaging angle of view") is a parameter for representing a range of the scene that is imaged by the left camera 11L (alternatively, the right camera 11R) by using an angle from an imaging element of the left camera 11L (alternatively, the right camera 11R).

Moreover, in the first modified example, the display controlling unit 132 is configured to extract (in other words, clip), from the left camera image captured by the left camera 11L, an image portion corresponding to the set left image angle θL that is at least one portion of the left camera image captured by the left camera 11L. Namely, the display controlling unit 132 is configured to extract, from the left camera image captured by the left camera 11L, the image portion that shows (includes) the scene corresponding to the set left image angle θL. Then, the display controlling unit 132 controls the display 14 to display the extracted image portion as the left camera image. Note that the left camera image captured by the left camera 11L is referred to as a "left camera image 111L" and the left camera image actually displayed on the display 14 (namely, the image portion extracted from the left camera image 111L by the display controlling unit 132) is referred to as a "left camera image 112L", in order to distinguish both left camera images from each other, for the purpose of simple description, in the following description.

Figure 7A:
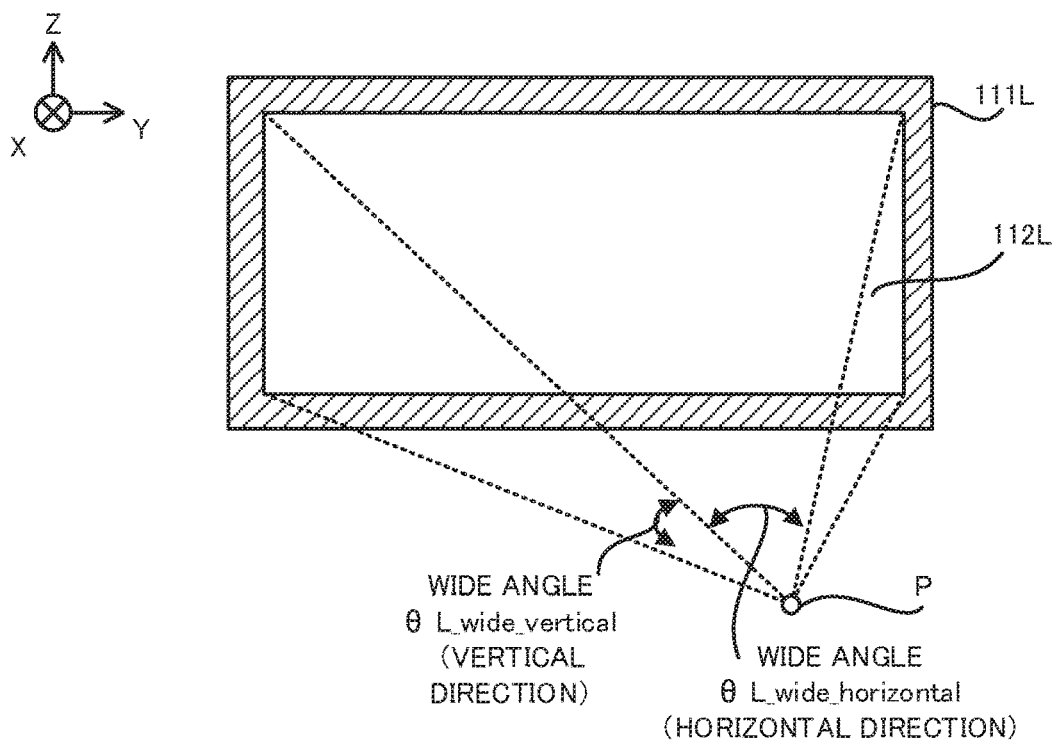
FIG. 7(*a*) is a planar view that illustrates a range of a left camera image that is extracted when the left door is in the opened state and FIG. 7(*b*) is a planar view that illustrates a range of a left camera image that is extracted when the left door is in the closed state.
Figure 7B:
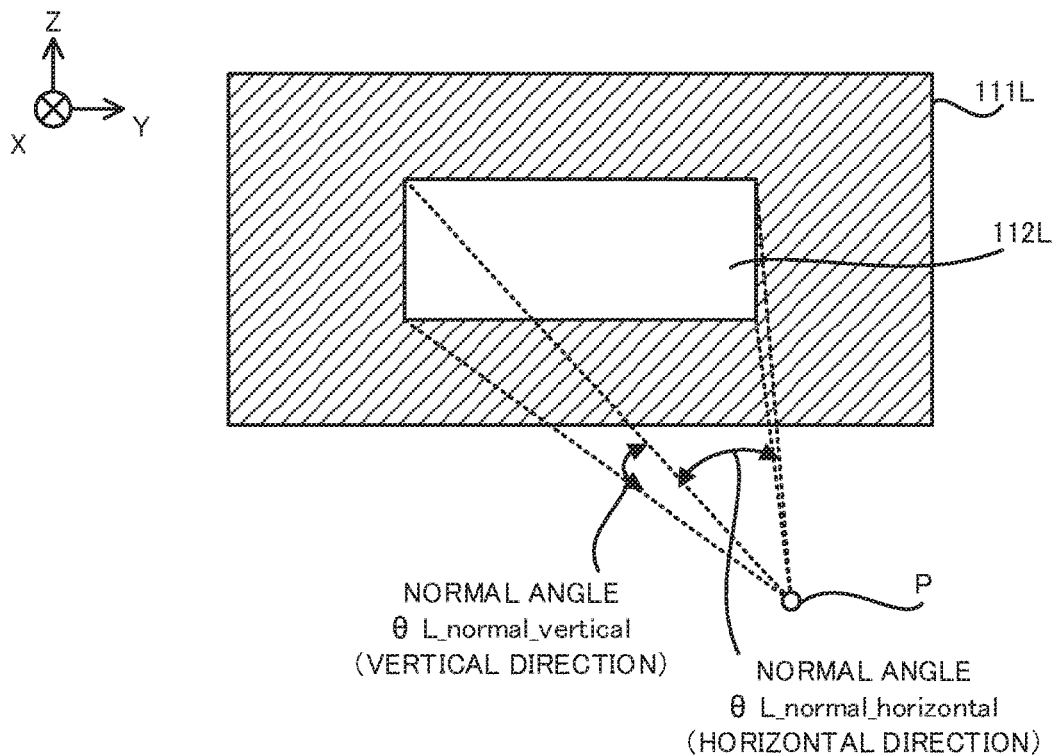

Specifically, if the left image angle $\theta L$ is set to the wide angle $\theta L\_wide$, the display controlling unit 132 extracts, as the left camera image 112L, a relatively large image portion corresponding to the wide angle $\theta L\_wide$ from the left camera image 111L, as illustrated in FIG. 7(a). On the other hand, if the left image angle $\theta L$ is set to the normal angle $\theta L\_normal$, the display controlling unit 132 extracts, as the left camera image 112L, a relatively small image portion corresponding to the normal angle $\theta L\_normal$ from the left camera image 111L, as illustrated in FIG. 7(b). Therefore, it can be said that the left image angle $\theta L$ is substantially a parameter for representing a range of the image portion of the left camera image 111L that is extracted as the left camera image 112L. Note that FIG. 7(a) and FIG. 7(b) illustrate an example in which the left image angle $\theta L$ includes an angle $\theta L\_h$ and an angle $\theta L\_v$, wherein the angle $\theta L\_h$ is an angle (namely, an angle along the horizontal direction) between a pair of virtual lines or virtual planes that extend from the virtual viewpoint P to a pair of vertical outer edges (outer borders) of the range of the image portion that is to be extracted as the left camera image 112L, respectively, and the angle $\theta L\_v$ is an angle (namely, an angle along the vertical direction) between a pair of virtual lines or virtual planes that extend from the virtual viewpoint P to a pair of horizontal outer edges (outer borders) of the range of the image portion that is to be extracted as the left camera image 112L, respectively. In this case, the wide angle $\theta L\_wide$ also includes a wide angle $\theta L\_wide\_h$ along the horizontal direction and a wide angle $\theta L\_wide\_v$ along the vertical direction, and the normal angle $\theta L\_normal$ also includes a normal angle $\theta L\_normal\_h$ along the horizontal direction and a normal angle $\theta L\_normal\_v$ along the vertical direction In parallel with, after or before the process from the step S11 and the step S32 to the step S33, the display controlling unit 132 determines on the basis of the detection result of the door sensor 12 whether or not the right door 15R is in the opened state (a step S21).

As a result of the determination at the step S21, if it is determined that the right door 15R is in the opened state (the step S21: Yes), the display controlling unit 132 sets the right image angle $\theta R$ to a wide angle $\theta R\_wide$ and controls the display 14 to display the right camera image that corresponds to the wide angle $\theta R\_wide$ (a step S42). On the other hand, as a result of the determination at the step S21, if it is determined that the right door 15R is not in the opened state (namely, is in the closed state) (the step S21: No), the display controlling unit 132 sets the right image angle $\theta R$ to a normal angle $\theta R\_normal$ and controls the display 14 to display the right camera image that corresponds to the normal angle $\theta R\_normal$ (a step S43). The wide angle $\theta R\_wide$ is larger (in other words, wider) than the normal angle $\theta R\_normal$. Thus, when the right door 15R is in the opened state, the right camera image is displayed at a wide angle (namely, the right camera image is displayed at the angle of view that is larger (wider) than the angle of view used when the right door 15R is in the closed state).

The wide angle $\theta R\_wide$ and the normal angle $\theta R\_normal$ may be set in advance or may be set by the display controlling device 132 during the display operation, as with the wide angle $\theta L\_wide$ and the normal angle $\theta L\_normal$. In this case, the normal angle $\theta R\_normal$ may be set such that the scene shown by the right camera image corresponding to the normal angle $\theta R\_normal$ is same as the scene that is reflected in the door mirror placed at the right door 15R when the right door 15R is in the closed state, under the assumption that the door mirror is placed at the right door 15R.

Each of the right camera image corresponding to the wide angle $\theta R\_wide$ and the right camera image corresponding to the normal angle $\theta R\_normal$ are displayed in the same manner as each of the left camera image corresponding to the wide angle $\theta L\_wide$ and the left camera image corresponding to the normal angle $\theta L\_normal$ being displayed. Thus, the detailed description of the display of the right camera image corresponding to the wide angle $\theta R\_wide$ and the right camera image corresponding to the normal angle $\theta R\_normal$ will be omitted. However, the outline thereof will be described briefly. Firstly, the imaging angle of view of the right camera 11R in the first modified example is larger than the imaging angle of view of the right camera 11R when the above described display operation illustrated in FIG. 4. Moreover, in the first modified example, the display controlling unit 132 is configured to extract, from the right camera image captured by the right camera 11R, an image portion corresponding to the set right image angle $\theta R$ that is at least one portion of the right camera image captured by the right camera 11R. Then, the display controlling unit 132 controls the display 14 to display the extracted image portion as the right camera image. Note that the right camera image captured by the right camera 11R is referred to as a "right camera image 111R" and the right camera image actually displayed on the display 14 is referred to as a "right camera image 112R", in order to distinguish both left camera images from each other, for the purpose of simple description, in the following description.

Figure 8A:
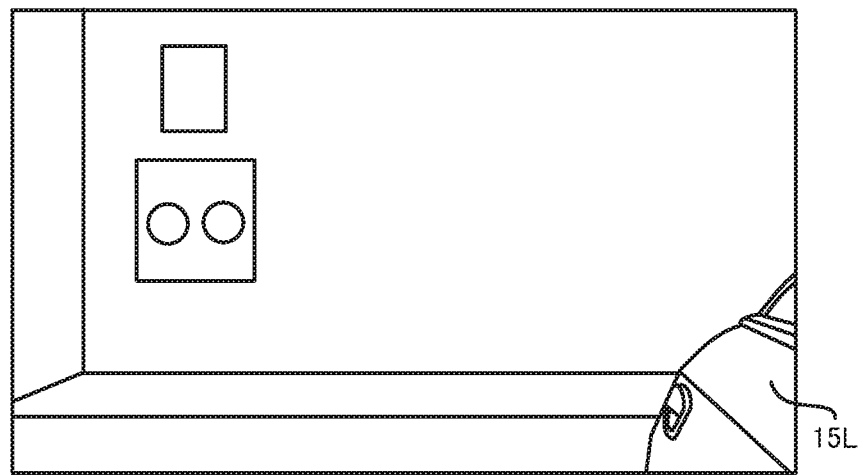
FIG. 8(*a*) is a planar view that illustrates the left camera image that is displayed on the display when the left door is in the closed state and FIG. 8(*b*) is a planar view that illustrates the left camera image that is displayed on the display when the left door is in the closed state.
Figure 8B:
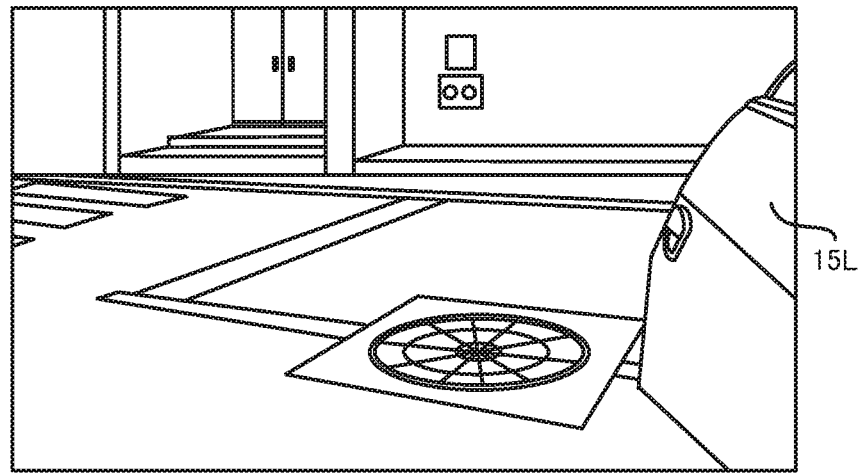

As described above, in the first modified example, the left image angle $\theta L$ becomes larger (namely, is enlarged) in the case where the left door 15L is in the opened state, compared to the case where the left door 15L is in the closed state. If the left image angle $\theta L$ becomes larger, the left camera image 112L shows a scene covering a larger (in other words, wider) range. For example, the left camera image 112L corresponding to the wide angle $\theta L\_wide$ that is illustrated in FIG. 8(b) shows the scene covering a larger range than the left camera image 112L corresponding to the normal angle $\theta L\_normal$ that is illustrated in FIG. 8(a). Moreover, there is a higher possibility that the left camera image 112L corresponding to the wide angle $\theta L\_wide$ shows a ground surface (in other words, a land surface), compared to the left camera image 112L corresponding to the normal angle $\theta L\_normal$. As a result, the occupant can understand the surrounding circumstance of the vehicle 1 from the left camera image 112L more easily in the case where the left door 15L is in the opened state, compared to the case where the left door 15L is in the closed state. Namely, the occupant can understand more easily which position in the surrounding area of the vehicle 1 corresponds to the scene shown by the left camera image 112L. Thus, the occupant understands easily that the left camera image 112L displayed on the display 14 is not the image showing the circumstance of the left rear area BL_area that is expected to be imaged by the left camera 11L. In other words, the occupant does not misunderstand easily that the left camera image 112L displayed on the display 14 is the image showing the circumstance of the left rear area BL_area. Thus, it is possible to appropriately prevent the occupant who watches the left camera image 112L displayed on the display 14 when the left door 15L is in the opened state from misunderstanding the surrounding circumstance of the vehicle 1 (especially, the circumstance of the left rear area BL_area).

Similarly, in the first modified example, the right image angle θR becomes larger (namely, is enlarged) in the case where the right door 15R is in the opened state, compared to the case where the right door 15R is in the closed state. If the right image angle θR becomes larger, the right camera image 112R shows a scene covering a larger (in other words, wider) range. As a result, the occupant can understand the surrounding circumstance of the vehicle 1 from the right camera image 112R more easily in the case where the right door 15R is in the opened state, compared to the case where the right door 15R is in the closed state. Namely, the occupant can understand more easily which position in the surrounding area of the vehicle 1 corresponds to the scene shown by the right camera image 112R. Thus, the occupant understands easily that the right camera image 112R displayed on the display 14 is not the image showing the circumstance of the right rear area BR_area that is expected to be imaged by the right camera 11R. In other words, the occupant does not misunderstand easily that the right camera image 112R displayed on the display 14 is the image showing the circumstance of the right rear area BR_area. Thus, it is possible to appropriately prevent the occupant who watches the right camera image 112R displayed on the display 14 when the right door 15R is in the opened state from misunderstanding the surrounding circumstance of the vehicle 1 (especially, the circumstance of the right rear area BR_area).

Note that the ECU 13 uses a method of setting the left image angle θL in order to extract the left camera image 112L from the left camera image 111L in the above described description. However, the ECU 13 may use another method in order to extract the left camera image 112L from the left camera image 111L. Similarly, the ECU 13 uses a method of setting the right image angle θR in order to extract the right camera image 112R from the right camera image 111R in the above described description. However, the ECU 13 may use another method in order to extract the right camera image 112R from the right camera image 111R.

In the abode described description, the ECU 13 changes the display aspect of the display 14 (especially, the display aspect of the left camera image 112L) by changing an extracted area (in other words, an extracted range) in the left camera image 111L that is extracted as the left camera image 112L on the basis of the left image angle θL. However, the ECU 13 may change the display aspect of the display 14 by using another method, in addition to or instead of the method of changing the extracted area in the left camera image 111L that is extracted as the left camera image 112L. For example, the ECU 13 may change the display aspect of the display 14 by changing the imaging angle of view of the left camera 11L (for example, changing a focal length of an optical system such as a lens of the left camera 11L) on the basis of the left image angle θL. Specifically, the ECU 13 may set the imaging angle of view of the left camera 11L to a first angle corresponding to the wide angle θL_wide if the left door 15L is in the opened state, and may set the imaging angle of view of the left camera 11L to a second angle corresponding to the normal angle θL_normal if the left door 15L is in the closed state. Namely, the ECU 13 may change the display aspect of the display 14 by displaying the left camera image 111L (alternatively, the left camera image 112L extracted from the left camera image 111L, the same applies to this paragraph) captured by the left camera 11L in which the imaging angle of view is set to the first angle if the left door 151 is in the opened state, and by displaying the left camera image 111L captured by the left camera 11L in which the imaging angle of view is set to the second angle if the left door 151 is in the closed state. Alternatively, if the vehicle 1 has two or more left cameras 111L that have different imaging angles of view, respectively, the ECU 13 may change the display aspect of the display 14 by selecting, on the basis of the left image angle θL, one left camera 11L from which the ECU 13 obtains the left camera image 111 that is to be displayed on the display 14. Specifically, the ECU 13 may select a first left camera 11L in which the imaging angle of view is set to the first angle corresponding to the wide angle θL_wide if the left door 151 is in the opened state, and may select a second left camera 11L in which the imaging angle of view is set to the second angle corresponding to the normal angle θL_normal if the left door 151 is in the closed state. Namely, the ECU 13 may change the display aspect of the display 14 by displaying the left camera image 111L captured by the first left camera 11L if the left door 151 is in the opened state, and by displaying the left camera image 111L captured by the second left camera 11L if the left door 151 is in the closed state. The same applies to the display aspect of the right camera image 112R.

If at least one of the left door 15L and the right door 15R is in the opened state, the alert display may be performed in addition to the left image angle θL and the right image angle θL being changed, even in the first modified example. Alternatively, even if at least one of the left door 15L and the right door 15R is in the opened state, the alert display may not be performed. If the alert display is not performed, the ECU 13 may not have the alert controlling unit 133.

The ECU 13 may control the display aspect of the display 14 such that the display aspect of the display 14 is changed by using another method that is different from the method of performing the alert display and the method of changing the left image angle θL in the case where the left door 15L is in the opened state, compared to the case where the left door 15L is in the closed state. This is because the occupant does not misunderstand easily that the left camera image 112L displayed on the display 14 is the image showing the circumstance of the left rear area BL_area in the case where the display aspect of the display 14 when the left door 15L is in the opened state is different from the display aspect of the display 14 when the left door 15L is in the closed state, compared to the case where the display aspect of the display 14 when the left door 15L is in the opened state is same as the display aspect of the display 14 when the left door 15L is in the closed state (for example, in the case where the alert display is not performed or the left image angle θL is fixed). The same applies to the display of the right camera image.

(4-2) Another Modified Example

The above described description uses an example in which the left camera 11L and the right camera 11R are placed at the left door 15L and the right door 15R that are allowed to be opened and closed in the horizontal direction, respectively. However, the display operation including the above described alert display may be performed in the case where a camera is placed at another type of door that is allowed to be opened and closed in a direction (for example, a direction along a vertical direction or a direction that inclining the vertical direction) that intersects with the horizontal direction. At least one of a lift type door (for example, a vertical door, a gullwing door and the like), a door for a rear baggage compartment of the vehicle 1 and the like is one example of another type of door. Even in this case, if another type of door is in the opened state, the display 14 may perform the alert display for alerting that another type of door is in the opened state while displaying the image that is captured by a camera placed at another type of door. Alternatively, if another type of door is in the opened state, the display 14 may display the image that is captured by the camera placed at another type of door after changing (specifically, enlarging) the angle of view of the image. As a result, it is possible to appropriately prevent the occupant who watches the image displayed on the display 14 when another type of door is in the opened state from misunderstanding the surrounding circumstance of the vehicle 1.

However, if the door at which the camera is placed is allowed to be opened and closed in the direction intersecting with the horizontal direction, there is not so strong tendency that the occupant of the vehicle 1 is more likely not to able to easily distinguish the surrounding circumstance of the vehicle 1 shown by the image captured by the camera when the door is in the opened state from the surrounding circumstance of the vehicle 1 shown by the image captured by the camera when the door is in the closed state at first glance compared to the case where the door at which the camera is placed is allowed to be opened and closed in the horizontal direction. This is because there is more possibility that the camera placed at the door images not an area on the side of the vehicle 1 that is imaged by the camera when the door is in the closed state but an area above the vehicle 1 (namely, a sky) or an area below the vehicle 1 (namely, a ground surface), if the door that is allowed to be opened and closed in the direction intersecting with the horizontal direction is in the opened state. Thus, the technical effect that it is possible to prevent the occupant from misunderstanding the surrounding circumstance of the vehicle 1 is improved in the case where the door at which the camera is placed is allowed to be opened and closed in the horizontal direction. However, the technical effect that it is possible to prevent the occupant from misunderstanding the surrounding circumstance of the vehicle 1 is achieved to some extent even in the case where the door at which the camera is allowed to be opened and closed in the direction intersecting with the horizontal direction, because the alert display is performed and/or the angle of view of the image displayed on the display 14 is changed.

Figure 9A:
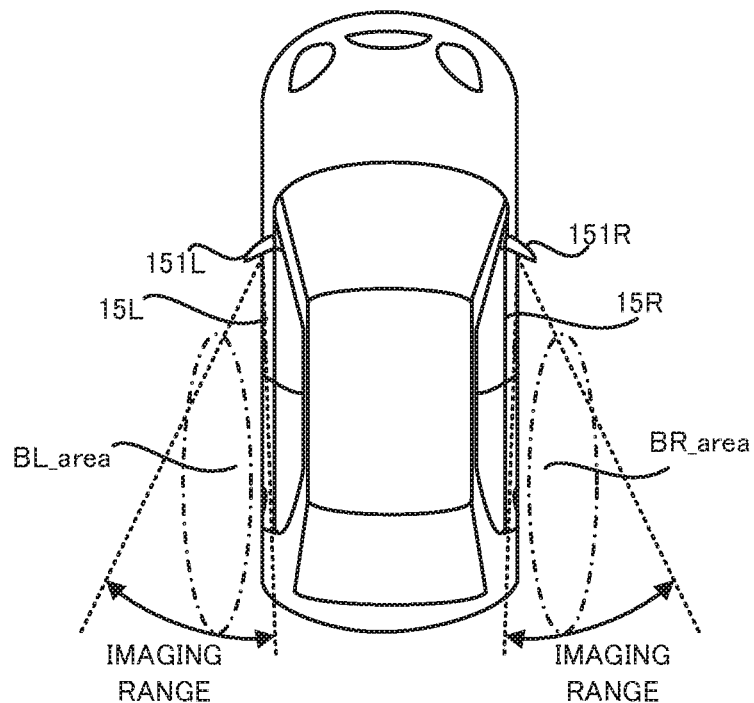
FIG. 9(*a*) is a planar view that illustrates the imaging range of each of the left camera and the right camera when a housing is in a first state and FIG. 9(*b*) is a planar view that illustrates the imaging range of each of the left camera and the right camera when a housing is in a second state.
Figure 9B:
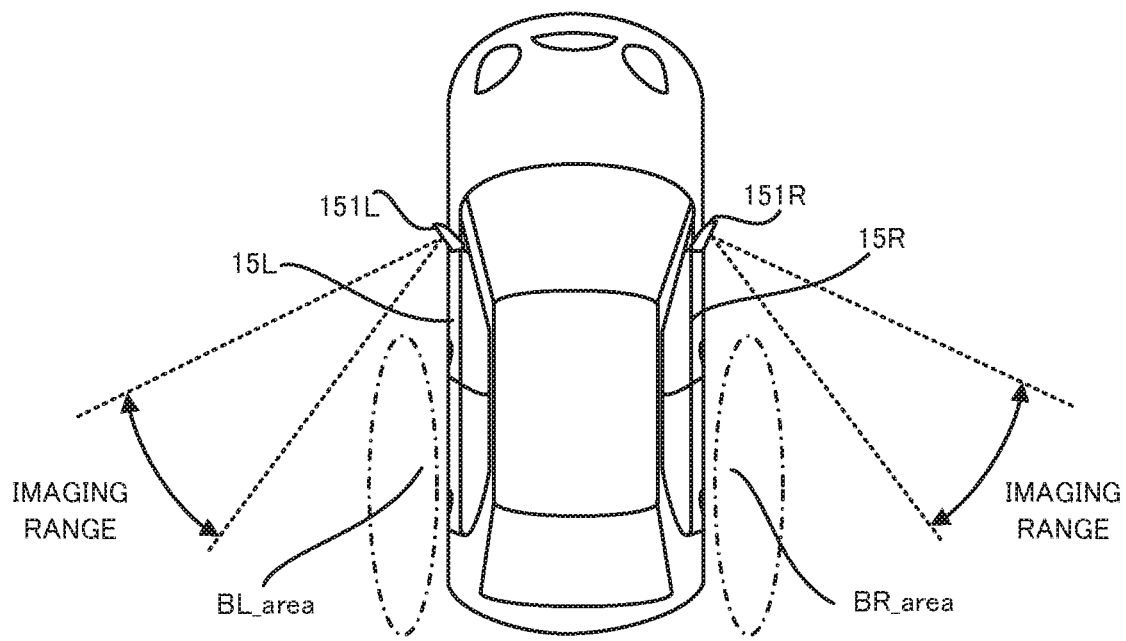

The camera housing 151L that houses the left camera 11L may be movable. For example, a state of the camera housing 151L may be switched between a first state (see FIG. 9(a)) at which it is possible for the left camera 11L to image the left rear area BL_area and a second state (see FIG. 9(b)) at which it is impossible for the left camera 11L to image the left rear area BL_area due to the movement of the camera housing 151L. In this case, the display 14 displays the left camera image showing the circumstance of the undesired area that is not expected to be imaged by the left camera 11L, if the camera housing 151L is in the second state. As a result, although the left camera image may not show the side surface of the left door 15L, there is a possibility that the occupant may misunderstand the circumstance of the left rear area BL_area of the vehicle 1, as with the case where the left door 15L is in the opened state. Thus, the ECU 13 may control the display aspect of the display 14 such that the display aspect of the display 14 is changed by performing the alert display and/or by enlarging the left image angle θL in the case where the camera housing 151L is in the second state, compared to the case where the camera housing 151L is in the first state. As a result, it is possible to appropriately prevent the occupant from misunderstanding the surrounding circumstance of the vehicle 1, even in the case where the left camera 15L is placed in the camera housing 151L. Similarly, when the camera housing 151R that houses the right camera 11R is movable, the ECU 13 may control the display aspect of the display 14 such that the display aspect of the display 14 is changed by performing the alert display and/or by enlarging the right image angle θR in the case where the camera housing 151R is in a second state at which it is impossible for the right camera 11R to image the right rear area BR_area, compared to the case where the camera housing 151R is in a first state at which it is possible for the right camera 11R to image the right rear area BR_area.

(5) Additional Statement

Relating to the above described embodiment, following additional statements will be disclosed.

(5-1) Additional Statement 1

An image display apparatus according to the additional statement 1 is an image display apparatus having: an imager that is placed at a door of a vehicle and that is configured to image an external circumstance of the vehicle; a display that is configured to display an external image captured by the imager; and a controller that is configured to control a display aspect of the display when the display displays the external image, the controller being configured to control the display aspect such that the display aspect when the door is in an opened state is different from the display aspect when the door is in a closed state.

Alternatively, an image display apparatus according to the additional statement 1 may be an image display apparatus having: an imaging device that is placed at a door of a vehicle and that is configured to image an external circumstance of the vehicle; a displaying device that is configured to display an external image captured by the imaging device; and a controlling device that is configured to control a display aspect of the displaying device when the displaying device displays the external image, the controlling device being configured to control the display aspect such that the display aspect when the door is in an opened state is different from the display aspect when the door is in a closed state.

The image display apparatus according to the additional statement 1 allows the display aspect (in other words, the display manner) of the displaying device (or the display) for displaying the external image to be changed in the case where the door is in the opened state, compared to the case where the door is in the closed state. Thus, an occupant of the vehicle can understand that the external image displayed on the displaying device is not an image showing a desired area that is expected to be imaged by the imaging device (or the imager). Typically, the occupant of the vehicle can understand that the external image displayed on the displaying device is not an image showing an area that is expected to be imaged by the imaging device when the door is in the closed state. In other words, the occupant of the vehicle does not misunderstand that the external image displayed on the displaying device is the image showing the desired area that is expected to be imaged by the imaging device. Thus, the image display apparatus according to the additional statement 1 is capable of preventing the occupant who watches the external image displayed on the displaying device when the door of the vehicle is in the opened state from misunderstanding the surrounding circumstance of the vehicle.

(5-2) Additional Statement 2

An image display apparatus according to the additional statement 2 is the image display apparatus according to the additional statement 1, wherein the controller is configured to control the display aspect such that an alert display for alerting that the door is in the opened state is performed, if the door is in the opened state.

Alternatively, an image display apparatus according to the additional statement 2 may be the image display apparatus according to the additional statement 1, wherein the controlling device is configured to control the display aspect such that an alert display operation for alerting that the door is in the opened state is performed, if the door is in the opened state.

The image display apparatus according to the additional statement 2 allows the displaying device (or the display) for displaying the external image to perform the alert display, if the door is in the opened state. Namely, the display aspect is changed such that the alert display is performed in the case where the door is in the opened state, compared to the case where the door is in the closed state. Thus, the occupant of the vehicle does not misunderstand that the external image displayed on the displaying device is the image showing the desired area that is expected to be imaged by the imaging device. Thus, the image display apparatus according to the additional statement 2 is capable of preventing the occupant who watches the external image displayed on the displaying device when the door of the vehicle is in the opened state from misunderstanding the surrounding circumstance of the vehicle.

(5-3) Additional Statement 3

An image display apparatus according to the additional statement 3 is the image display apparatus according to the additional statement 2, wherein the controller is configured to control the display aspect such that the alert display is performed while the external image is displayed.

Alternatively, an image display apparatus according to the additional statement 3 may be the image display apparatus according to the additional statement 2, wherein the controlling device is configured to control the display aspect such that the alert display is performed while the external image is displayed.

In the image display apparatus according to the additional statement 3, the displaying device for displaying the external image performs the alert display while displaying the external image. Thus, the image display apparatus according to the additional statement 3 is capable of preventing, more appropriately, the occupant who watches the external image displayed on the displaying device when the door of the vehicle is in the opened state from misunderstanding the surrounding circumstance of the vehicle.

(5-4) Additional Statement 4

An image display apparatus according to the additional statement 4 is the image display apparatus according to the additional statement 2 or 3, wherein the controller is configured to control the display aspect such that the alert display is performed while the external image is kept to be displayed during a period when the door is in the opened state.

Alternatively, an image display apparatus according to the additional statement 4 may be the image display apparatus according to the additional statement 2 or 3, wherein the controlling device is configured to control the display aspect such that the alert display is performed while the external image is kept to be displayed during a period when the door is in the opened state.

In the image display apparatus according to the additional statement 4, the displaying device for displaying the external image performs the alert display while keeping displaying the external image during the period when the door is in the opened state. Thus, the image display apparatus according to the additional statement 4 is capable of preventing, more appropriately, the occupant who watches the external image displayed on the displaying device when the door of the vehicle is in the opened state from misunderstanding the surrounding circumstance of the vehicle. Moreover, the image display apparatus according to the additional statement 4 is capable of satisfying a regulation (for example, UN-R46 and so on) that requires that the external image keeps being displayed when the door is in the opened state.

(5-5) Additional Statement 5

An image display apparatus according to the additional statement 5 is the image display apparatus according to any one of the additional statements 2 to 4, wherein the alert display includes at least one of a first display for displaying an alert icon for alerting that the door is in the opened state, a second display for alerting that the door is in the opened state by decorating an outer frame of the external image and a third display for displaying an alert message for alerting that the door is in the opened state.

The image display apparatus according to the additional statement 5 is capable of performing the alert display appropriately.

(5-6) Additional Statement 6

An image display apparatus according to the additional statement 6 is the image display apparatus according to any one of the additional statements 1 to 5, wherein the controller is configured to control the display aspect such that an angle of view of the external image displayed when the door is in the opened state is larger than an angle of view of the external image displayed when the door is in the closed state.

Alternatively, an image display apparatus according to the additional statement 6 may be the image display apparatus according to any one of the additional statements 1 to 5, wherein the controlling device is configured to control the display aspect such that an angle of view of the external image displayed when the door is in the opened state is larger than an angle of view of the external image displayed when the door is in the closed state The image display apparatus according to the additional statement 6 allows the display aspect to be changed such that the angle of view of the external image displayed on the displaying device becomes larger in the case where the door is in the opened state, compared to the case where the door is in the closed state. If the angle of view of the external image becomes relatively large, the external image shows a scene covering a relatively large range. As a result, the occupant of the vehicle can understand the surrounding circumstance of the vehicle from the external image more easily in the case where the door is in the opened state, compared to the case where the door is in the closed state.

Namely, the occupant of the vehicle can understand more easily which position in the surrounding area of the vehicle corresponds to the scene shown by the external image. Thus, the occupant of the vehicle does not misunderstand easily that the external image displayed on the displaying device is the image showing the desired area that is expected to be imaged by the imaging device. Thus, the image display apparatus according to the additional statement 6 is capable of preventing the occupant who watches the external image displayed on the displaying device when the door of the vehicle is in the opened state from misunderstanding the surrounding circumstance of the vehicle.

(5-7) Additional Statement 7

An image display apparatus according to the additional statement 7 is the image display apparatus according to any one of the additional statements 1 to 6, wherein the door is a door that is allowed to be opened and closed in a horizontal direction.

If the imaging device is placed at the door that is allowed to be opened and closed in the horizontal direction, there is a relatively high possibility that both of the external image captured by the imaging device when the door is in the opened state and the external image captured by the imaging device when the door is in the closed state shows the side circumstance of the vehicle. Namely, the occupant of the vehicle is more likely not to able to easily distinguish the external image captured by the imaging device when the door is in the opened state from the external image captured by the imaging device when the door is in the closed state at first glance. As a result, the occupant of the vehicle is more likely to misunderstand that the external image displayed on the displaying device when the door is in the opened state is the image showing the desired area that is expected to be imaged by the imaging device. Thus, the image display apparatus according to the additional statement 7 is capable of preventing, more appropriately, the occupant who watches the external image displayed on the displaying device when the door of the vehicle is in the opened state from misunderstanding the surrounding circumstance of the vehicle, under the situation where the occupant of the vehicle is more likely not to able to easily distinguish the external image captured by the imaging device when the door is in the opened state from the external image captured by the imaging device when the door is in the closed state at first glance.

(5-8) Additional Statement 8

An image display apparatus according to the additional statement 8 is an image display apparatus having: an imager that is placed at a movable housing and that is configured to image an external circumstance of a vehicle; a display that is configured to display an external image captured by the imager; and a controller that is configured to control a display aspect of the display when the display displays the external image, the controller being configured to control the display aspect such that the display aspect when the housing is in a first state is different from the display aspect when the housing moves to be is in a second state that is different from the first state.

Alternatively, an image display apparatus according to the additional statement 8 may be an image display apparatus having: an imaging device that is placed at a movable housing and that is configured to image an external circumstance of a vehicle; a displaying device that is configured to display an external image captured by the imaging device; and a controlling device that is configured to control a display aspect of the displaying device when the displaying device displays the external image, the controlling device being configured to control the display aspect such that the display aspect when the housing is in a first state is different from the display aspect when the housing moves to be is in a second state that is different from the first state.

When the imaging device is placed at the movable housing, there is a possibility that the external image showing the undesired area is displayed on the displaying device due to the movement of the housing, as with the case where the imaging device is placed at the door. The image display apparatus according to the additional statement 8 allows the display aspect to be changed in the case where the housing is in the first state, compared to the case where the hosing is in the second state. For example, the image display apparatus according to the additional statement 8 is allowed to perform the above described alert display and/or to change the angle of view of the external image displayed on the displaying device, if the housing is in a specific state at which it is impossible for the imaging device to image the desired area. Thus, the occupant of the vehicle does not misunderstand easily that the external image displayed on the displaying device is the image showing the desired area that is expected to be imaged by the imaging device. Thus, the image display apparatus according to the additional statement 8 is capable of preventing the occupant who watches the image displayed on the displaying device when the door of the vehicle is in the opened state from misunderstanding the surrounding circumstance of the vehicle.

Note that the image display apparatus according to the additional statement 8 may use an aspect that is used by the above described image display apparatus according to any one of the additional statements 1 to 7.

(5-9) Additional Statement 9

An image display apparatus according to the additional statement 9 is an image display apparatus having: an imaging device that is placed at a door of a vehicle and that is configured to image an external circumstance of the vehicle; and a displaying device that is configured to display an external image captured by the imaging device, the displaying device is configured to perform an alert display for alerting that the door is in an opened state, if the door is in the opened state.

Alternatively, an image display apparatus according to the additional statement 9 may be an image display apparatus having: an imager that is placed at a door of a vehicle and that is configured to image an external circumstance of the vehicle; and a display that is configured to display an external image captured by the imager, the display is configured to perform an alert display for alerting that the door is in an opened state, if the door is in the opened state.

The image display apparatus according to the additional statement 9 is capable of achieving an effect that is achieved by the image display apparatus according to the additional statement 2.

(5-10) Additional Statement 10

An image display apparatus according to the additional statement 10 is the image display apparatus according to the additional statement 9, wherein the displaying device is configured to perform the alert display while displaying the external image.

Alternatively, an image display apparatus according to the additional statement 10 may be the image display apparatus according to the additional statement 9, wherein the display is configured to perform the alert display while displaying the external image.

The image display apparatus according to the additional statement 10 is capable of achieving an effect that is achieved by the image display apparatus according to the additional statement 3.

(5-11) Additional Statement 11

An image display apparatus according to the additional statement 11 is the image display apparatus according to the additional statement 9 or 10, wherein the displaying device is configured to perform the alert display while keeping displaying the external image during a period when the door is in the opened state.

Alternatively, an image display apparatus according to the additional statement 11 may be the image display apparatus according to the additional statement 9 or 10, wherein the display is configured to perform the alert display while keeping displaying the external image during a period when the door is in the opened state.

The image display apparatus according to the additional statement 11 is capable of achieving an effect that is achieved by the image display apparatus according to the additional statement 4.

(5-12) Additional Statement 12

An image display apparatus according to the additional statement 12 is the image display apparatus according to any one of the additional statements 9 to 11, wherein the alert display includes at least one of a first display for displaying an alert icon for alerting that the door is in the opened state, a second display for alerting that the door is in the opened state by decorating an outer frame of the external image and a third display for displaying an alert message for alerting that the door is in the opened state.

The image display apparatus according to the additional statement 12 is capable of achieving an effect that is achieved by the image display apparatus according to the additional statement 5.

(5-13) Additional Statement 13

An image display apparatus according to the additional statement 13 is the image display apparatus according to any one of the additional statements 9 to 12, wherein the door is a door that is allowed to be opened and closed in a horizontal direction.

The image display apparatus according to the additional statement 13 is capable of achieving an effect that is achieved by the image display apparatus according to the additional statement 7.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2017-171071, filed on Sep. 6, 2017, the entire contents of which are incorporated herein by reference. This application is also based upon and claims the benefit of priority of the prior Japanese Patent Application No. 2018-094019, filed on May 15, 2018, the entire contents of which are incorporated herein by reference. In addition, the entire contents of the above described Patent Literatures 1 to 3 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An image display apparatus, which involve such changes, are also intended to be within the technical scope of the present invention.

REFERENCE SIGNS LIST 1 vehicle
11L left camera
11R right camera
12 door sensor
13 ECU
131 image obtaining unit
132 display controlling unit
133 alert controlling unit
14 display
15L left door
15R right door
151L, 151R camera housing
BL_area left rear area
BR_area right rear area

The invention claimed is:

1. An image display apparatus comprising:
an imager that is placed at a door of a vehicle and that is configured to capture an image of an external circumstance of the vehicle that corresponds to an area that is reflected in a door mirror;
a display that is configured to display an external image captured by the imager; and
an electronic control unit (ECU) including one or more processing circuits, configured to:
control a display aspect of the display when the display displays the external image,
control the display aspect such that the display aspect when the door is in an opened state is different from the display aspect when the door is in a closed state, by changing an optical characteristic of an optical system of the imager so that an imaging angle of view captured by the imager is set to a first angle when the door is in the opened state and a second angle when the door is in the closed state, and
wherein the first angle is wider than the second angle.

2. The image display apparatus according to claim 1, wherein
the ECU is further configured to control the display aspect such that an alert display for alerting that the door is in the opened state is performed, if the door is in the opened state.

3. The image display apparatus according to claim 2, wherein
the ECU is further configured to control the display aspect such that the alert display is performed while the external image is displayed.

4. The image display apparatus according to claim 2, wherein
the ECU is further configured to control the display aspect such that the alert display is performed while the external image is kept to be displayed during a period when the door is in the opened state.

5. The image display apparatus according to claim 2, wherein
the alert display includes at least one of a first display for displaying an alert icon for alerting that the door is in the opened state, a second display for alerting that the door is in the opened state by decorating an outer frame of the external image and a third display for displaying an alert message for alerting that the door is in the opened state.

6. The image display apparatus according to claim 1, wherein
the door is a door that is allowed to be opened and closed in a horizontal direction.

7. The image display apparatus according to claim 1, wherein the image of the external circumstance of the vehicle that is captured by the imager includes a side surface of the door on which the imager is placed, when the imaging angle of view is the first angle and when the imaging angle of view is the second angle.

8. An image display apparatus comprising:
an imager that is placed at a movable housing and that is configured to image an external circumstance of a vehicle that corresponds to an area that is reflected in a door mirror, the movable housing being placed at a door of the vehicle;
a display that is configured to display an external image captured by the imager; and
an electronic control unit including one or more processing circuits, configured to:
control a display aspect of the display when the display displays the external image,
control the display aspect by changing an optical characteristic of an optical system of the imager so that an imaging angle of view captured by the imager is set to a first angle when the movable housing is in a first state and a second angle when the movable housing is in a second state, wherein the first angle is wider than the second angle.

9. The image display apparatus according to claim 8, wherein the movable housing is movable with respect to the door of the vehicle.

10. The image display apparatus according to claim 8, wherein the image of the external circumstance of the vehicle that is captured by the imager includes a side surface of the door on which the imager is placed, when the imaging angle of view is the first angle and when the imaging angle of view is the second angle.

* * * * *